US009633328B2

(12) United States Patent
Sorensen (10) Patent No.: US 9,633,328 B2
(45) Date of Patent: Apr. 25, 2017

(54) IMPUTED PROBABILISTIC PRODUCT LOCATION BASED ON SHOPPER PATH AND TRANSACTION LOG DATA

(71) Applicant: Shopper Scientist, LLC, Corbett, OR (US)

(72) Inventor: Herb Sorensen, Corbett, OR (US)

(73) Assignee: Shopper Scientist LLC, Corbett, OR (US)

( * ) Notice: Subject to any disclaimer, the term of this patent is extended or adjusted under 35 U.S.C. 154(b) by 393 days.

(21) Appl. No.: 13/684,347

(22) Filed: Nov. 23, 2012

(65) Prior Publication Data

US 2013/0132241 A1 May 23, 2013

Related U.S. Application Data

(60) Provisional application No. 61/563,417, filed on Nov. 23, 2011.

(51) Int. Cl.
*G06Q 10/08* (2012.01)
*G06Q 30/06* (2012.01)
*G06Q 10/06* (2012.01)

(52) U.S. Cl.
CPC .......... *G06Q 10/087* (2013.01); *G06Q 30/06* (2013.01)

(58) Field of Classification Search
USPC .......... 705/7.29, 7.39, 27.1, 28; 707/999.104
See application file for complete search history.

(56) References Cited

U.S. PATENT DOCUMENTS

| 7,606,728 B2 * | 10/2009 | Sorensen | G06Q 30/02 705/7.29 |
| 2002/0178085 A1 * | 11/2002 | Sorensen | G06Q 30/0201 705/7.29 |
| 2005/0021561 A1 * | 1/2005 | Noonan | G06Q 30/06 |
| 2006/0010030 A1 | 1/2006 | Sorensen | |
| 2006/0200378 A1 | 9/2006 | Sorensen | |

(Continued)

OTHER PUBLICATIONS

ISA Korea, International Search Report and Written Opinion of PCT/US2012/066457, Mar. 14, 2013, WIPO, 12 pages.

*Primary Examiner* — Fahd Obeid
*Assistant Examiner* — Reva R Danzig
(74) *Attorney, Agent, or Firm* — Alleman Hall McCoy Russell & Tuttle LLP (57) ABSTRACT

Systems and methods for imputing the location of a product in a shopping environment are provided to address the above discussed problems. One example system disclosed herein includes a sensor system configured to track paths for a plurality of shoppers in a shopping environment. The system may further include a data analyzer computing device configured to receive signal data from the sensor system and transaction data from a point of sale system in the shopping environment. The transaction data may indicate the products purchased by the shopper in the shopping environment. The signal data may be matched to corresponding transaction data for the same shopping path. The system may impute one or more product locations of products in the transaction data associated with multiple shopper paths. The imputed product locations may be represented in a probability map, or used to make corrections to a preexisting planogram.

12 Claims, 7 Drawing Sheets

(56) References Cited

U.S. PATENT DOCUMENTS

2008/0306756 A1* 12/2008 Sorensen ............... G06Q 30/02
 705/27.1
2010/0280907 A1 11/2010 Wolinsky et al.
2013/0054310 A1* 2/2013 Sickenius ............. G06Q 30/02
 705/7.39

* cited by examiner

○ Traffic point 72
● Detected shopper position 74

IMPUTED PROBABILISTIC PRODUCT LOCATION BASED ON SHOPPER PATH AND TRANSACTION LOG DATA

CROSS REFERENCE TO RELATED APPLICATIONS

This application claims priority to U.S. Provisional Patent Application Ser. No. 61/563,417 filed Nov. 23, 2011, entitled IMPUTED PROBABILISTIC PRODUCT LOCATION BASED ON SHOPPER PATH AND TRANSACTION LOG DATA, the entire disclosure of which is herein incorporated by reference for all purposes.

BACKGROUND

Customers purchase a large number of goods in shopping environments. Retailers often strive to gather accurate information concerning the product presentation within a shopping environment to more effectively market their goods, and thereby increase sales. One type of information that is valuable to retailers is the precise location of products within their retail environments. Several challenges exist to gathering accurate product location data.

One prior method for identifying product locations involves an employee walking through a shopping environment and scanning product tags on the shelves, etc., for each product located in the shopping environment. The product ID is stored along with position information, and a map of products is generated, which may be referred to as a planogram. One drawback to this method is that human error can result in erroneous planograms. Common errors include skipping products during scanning, and moving products after they have been scanned so that the actual location no longer matches the planogram. Further, scanning by employees takes time and is expensive, in addition to being subject to errors. Thus, current methods suffer from high cost, delay, and inaccuracy. These problems are exacerbated by frequent, planned movement of products by management from one location to another. Further, it will be appreciated that planograms are also created by store management prospectively to instruct employees where to place products, however various issues may arise during actual product placement in which the fulfillment of the planogram-specified product placements may be impossible or impractical, and thus differences may arise between the product placement plan specified in the planogram and the actual product placement in the store.

SUMMARY

Systems and methods for imputing the location of a product in a shopping environment are provided to address the above discussed problems. One example system disclosed herein includes a sensor system configured to track paths for a plurality of shoppers in a shopping environment. The system may further include a data analyzer computing device configured to receive signal data from the sensor system and transaction data from a point of sale system in the shopping environment. The transaction data may indicate the products purchased by the shopper in the shopping environment. The signal data may be matched to corresponding transaction data for the same shopping path. The system may impute one or more product locations of products in the transaction data associated with multiple shopper paths. The imputed product locations may be represented in a probability map, or used to make corrections to a preexisting planogram.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
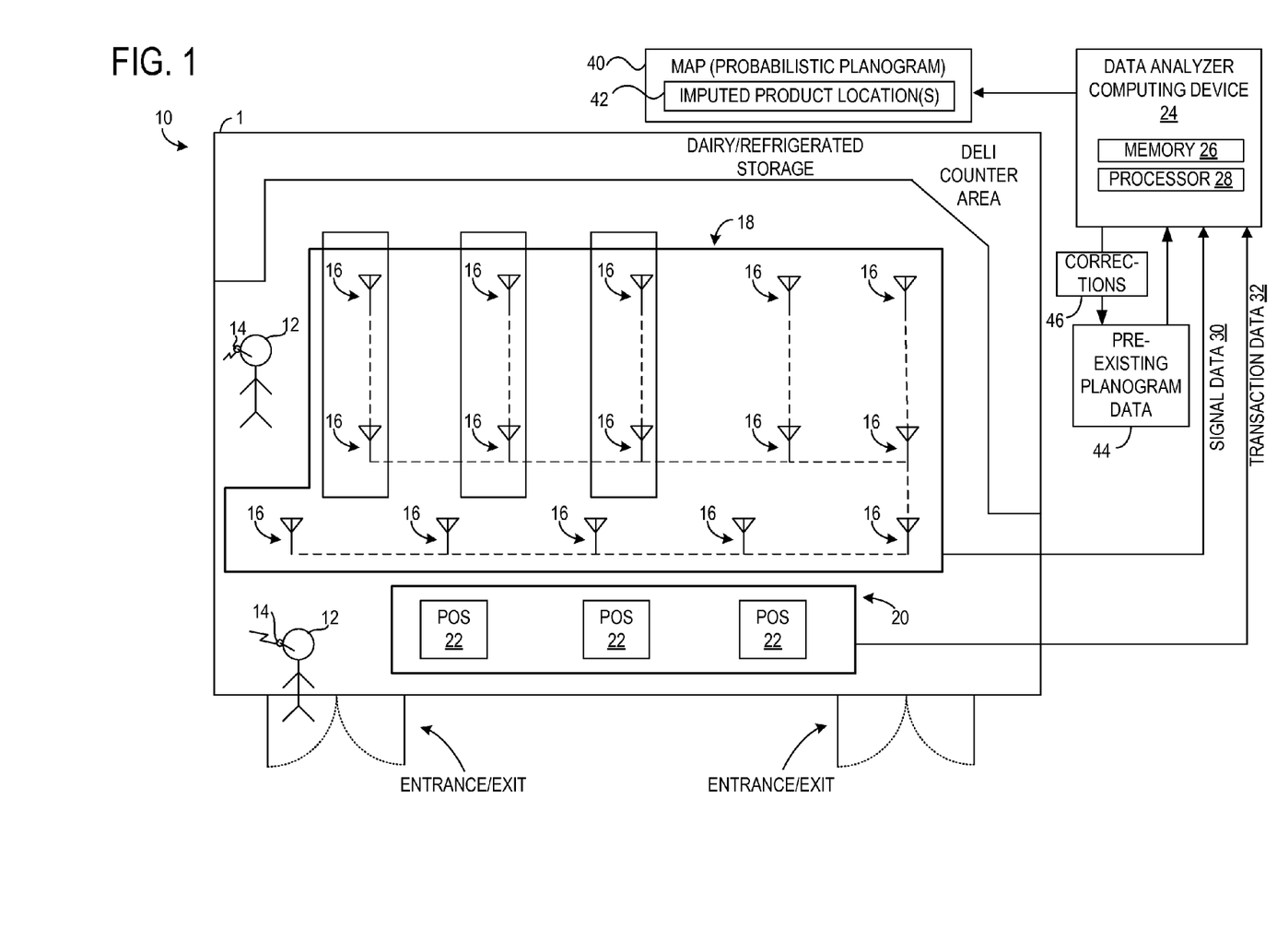
FIG. 1 is a schematic view of a system for imputing the location of products in a shopping environment, according to one embodiment.

FIG. 1 is a schematic view of a system 10 for imputing the location of products in a shopping environment, according to one embodiment. It will be appreciated that the shopping environment 1 may be, for example, a physical building serving as a retail location in which various products are offered for sale. Example shopping environments include supermarkets, clothing retailers, department stores, hardware stores, bazaars, malls, etc.

It will be appreciated that products may be located throughout the shopping environment 1, on a plurality of shelves, counters, bins, racks, and the like, and may positioned at one or more locations in the shopping environment 1. The system 10 may include a sensor system 18 configured to track a series of positions, which form paths, of each of a plurality of shoppers 12 in a shopping environment. Typically, the sensor system produces a path, which is a time ordered series of x, y or x, y, z coordinates within the store at which a shopper 12 is tracked.

The sensor system 18 may include a plurality of receivers 16 which receive signals from wireless transmission devices 14 associated with shoppers 12. Some of the shoppers 12 that enter shopping environment 1 may possess wireless transmission devices 14 on their person. For example, the wireless transmission device 14 may be a mobile phone or a wireless earpiece that utilizes the BLUETOOTH® standard to wirelessly communicate signals, which are picked up by receivers 16. Additionally or in the alternative, wireless transmission devices 14 may include WIFI transceivers, 3G or 4G transceivers, radio frequency identification (RFID) devices, or ultra wideband (UWB) emitters, for example. Thus, it will be appreciated that these wireless transmission devices 14 may be personal items owned by the shopper, or they may be placed in a shopper surrogate such as a shopping cart, or may be a device provided to the shopper for use while in the store.

Each receiver 16 may include a wireless receiver and an associated processor, such as an application specific integrated circuit, etc. The wireless receiver may be configured to receive signals from transmission devices 14. The processor of each receiver 16 may be configured to locally process the signals into signal data 30 of a form suitable for transmission to a data analyzer computing device 24, and then transmit the signal data 30 to the data analyzer computing device 24 over a suitable wired or wireless communication network, for downstream processing.

Figure 4A:
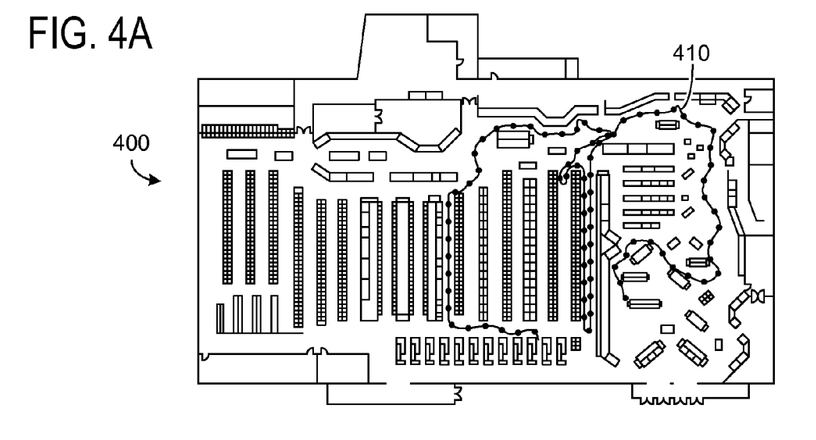
FIGS. 4A, 4B and 4C each show an exemplary graphical output of a shopper path through a shopping environment.
Figure 4B:
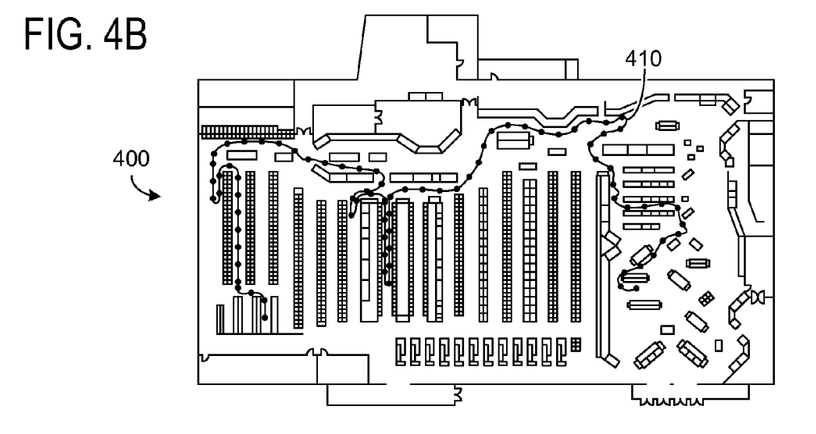
Figure 4C:
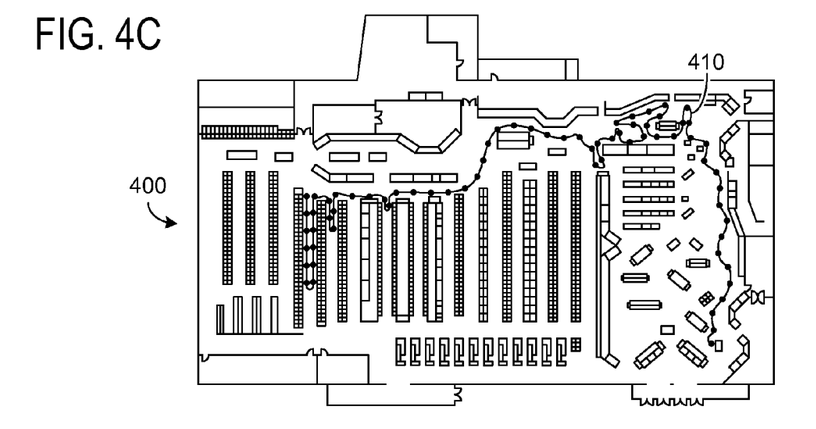

The plurality of receivers 16 may be positioned in an array such that the signal data 30 sent to the data analyzer computing device 24 from the receivers 16 may represent shopper paths throughout the entire shopping environment. The methodologies herein may be applied to arrays that are highly accurate, to within a few feet or less, and also to lower resolution arrays that are accurate, for example, to within 30-50 feet, depending on the application. Example shopper paths determined by the data analyzer based on the signal data are illustrated in FIGS. 4A, 4B and 4C.

The signal data 30 may include spatial, temporal, and shopper identification data. Spatial data may be in the form of points representing shopper paths on an X-Y or X-Y-Z coordinate grid organized with respect to a known reference datum. Temporal data may accompany spatial data to indicate the time at which a shopper was at a position along the path associated with the shopper within the shopping environment, and identifying data may comprise a MAC address or another identifier. The data analyzer computing device 24 is configured to analyze the signal data and produce path data representing paths traveled by each monitored shopper through the shopping environment over a monitoring period.

The system 10 for determining the location of products in a shopping environment may further include a point of sale (POS) system 20. The POS system may include a plurality of POS terminals 22 where shoppers make their purchases. Each POS terminal 22 may be configured to record shopper transaction data 32. The transaction data may indicate the time and location of the sale within the shopping environment as well as a list of all products purchased.

The POS system 20 may further be configured to communicate via a suitable wired or wireless communications network, such as WIFI or Ethernet, with the data analyzer computing device 24, to send the transaction data 32 to the data analyzer computing device, for downstream processing.

As briefly discussed above, the system for determining the location of products in a shopping environment may further include a data analyzer computing device 24. The data analyzer computing device 24 may include a memory 26 executable by a processor 28, and may be configured to receive signal data 30 and transaction data 32 via a network interface and associated WIFI antenna or network port. It will be appreciated that the data analyzer computing device 24 may be positioned at a remote location external to the shopping environment 1, such as at a central server. In other embodiments the data analyzer computing device may be positioned within the shopping environment. The data analyzer computing device 24 may be configured to store signal data and transaction data in a database. Additional hardware description of the data analyzer computing device is discussed below in relation to FIG. 9.

The data analyzer computing device 24 may also be configured to determine if signal data 30 represents a true path taken by a shopper. As one example, if a transmission device 14 was accidentally dropped and not recovered by a shopper, the data analyzer computing device 24 may be configured to recognize that the transmission device was stationary for a threshold period of time, and determine that the signal data 30 does not represent a path taken by a shopper. Similarly, when a shopping cart is abandoned by a shopper, or handed off between shoppers, a trip of exceedingly long length may result. Thus, trips that are determined to be over a threshold period of time, such as 2 hours, may be determined to be erroneous and discarded. It will be appreciated that other criteria for determining if signal data 30 represents a path taken by a shopper may be utilized in other embodiments.

The data analyzer computing device 24 may further be configured to match paths to corresponding transaction data 32 for the path. The transaction data may include a plurality of transaction records generated when shoppers have checked out and paid via the POS terminals 22. Matching of a path and corresponding transaction data 32 may be accomplished by comparing signal data 30 to transaction data 32 and matching the transaction record from the time and place of checkout with the shopper trip that intersects that same time and place. As a result, a plurality of shopper paths with linked transaction records may be produced.

Figure 2:
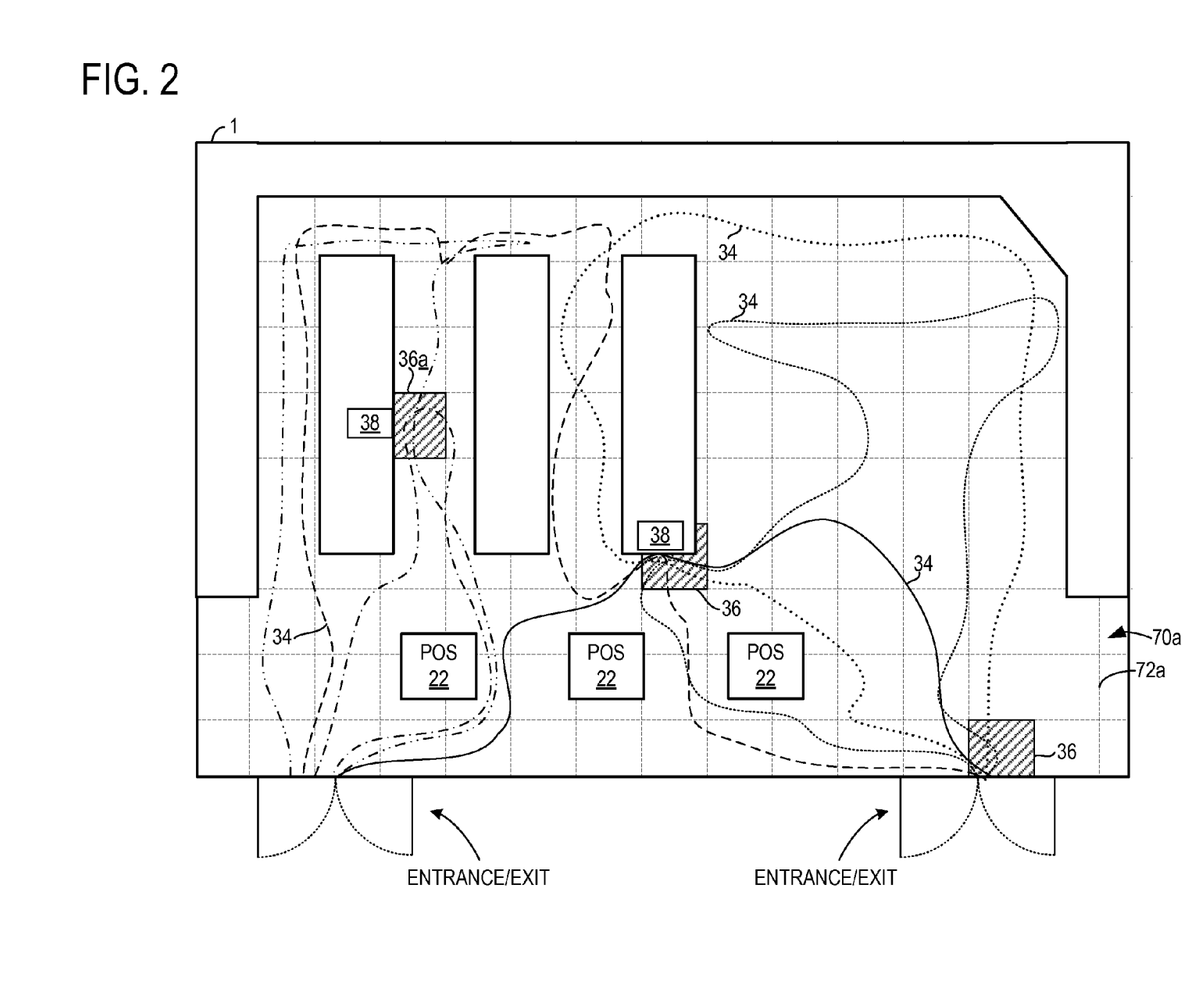
FIG. 2 is a schematic view showing a subset of shopper paths through the shopping environment shown in FIG. 1.

Proceeding to FIG. 2, a plurality of shopper paths 34 within the shopping environment 1 are shown. As discussed above, the data analyzer computing device 24 may be configured to impute a product location for one or more target products 38 based on shopper path data and transaction data 32. The target products 38 may include any products in the transaction data associated with more than one path, although it should be understood that the more paths with which the target product is determined to have been purchased, the higher the accuracy of the imputed location.

Imputing the product location may include determining a subset of paths 34 associated with a target product 38. FIG. 2 shows a subset of paths 34 taken by shoppers 12 who bought target product 38. Determining the subset of paths 34 associated with a target product 38 may first include searching transaction data to find a subset of transaction records indicating that the target product 38 was purchased. Once these transaction records have been identified, the subset of shopper paths 34 associated with the target product 38 may then be determined by selecting the shopper paths 34 corresponding to the identified transaction records.

Figure 10:
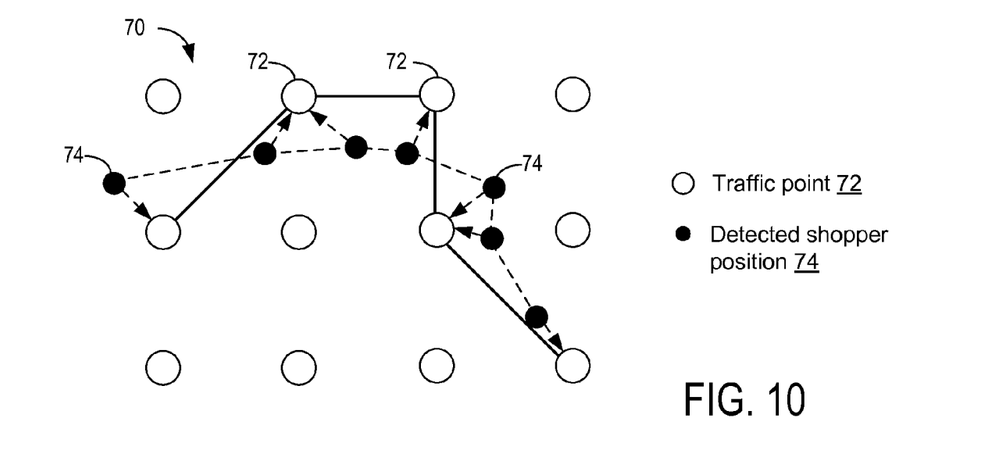
FIG. 10 is a schematic view illustrating a grid of traffic points to which the system of FIG. 1 may resolve shopper path data, in one example embodiment.

Imputing the product location may further include determining a path crossing region 36 in the subset of paths 34 associated with a target product 38. Turning briefly to FIG. 10, determining a path crossing region 36 may include resolving the paths to a grid of traffic points, in one example embodiment. The detected shopper positions may be resolved to a grid 70 of traffic points 72 by assigning each detected shopper position point 74 on a measured path 76 to the nearest traffic point 72 in the grid 70, as shown. Returning to FIG. 2, as another example, the store map may be divided into an X-Y coordinate grid 70a of squares 72a, and paths analyzed on a square-by-square within the grid 70a, as shown. Accordingly, the path crossing region 36 may encompass at least one traffic point 62 or one grid square 72a, for example, or may encompass more than one traffic point or grid square in other embodiments. In yet other embodiments, the store map may be divided into an X-Y-Z coordinate grid of cubes, and the path cross region 36 may be cube shaped.

It will be appreciated that minimum thresholds may be established to rule out mere chance crossing among paths 34. Thus, the path crossing regions may be determined to exist where the number of path crossings in a region of traffic points or a region of squares/cubes is greater than a threshold value. As an example, 5 path crossings in a 6 foot diameter region may be a minimum threshold to establish a path crossing region where the total sample size is 50 paths. This represents 10% of paths in the sample crossing at the path crossing region. Of course, other minimum thresholds may also be established.

Figure 6:
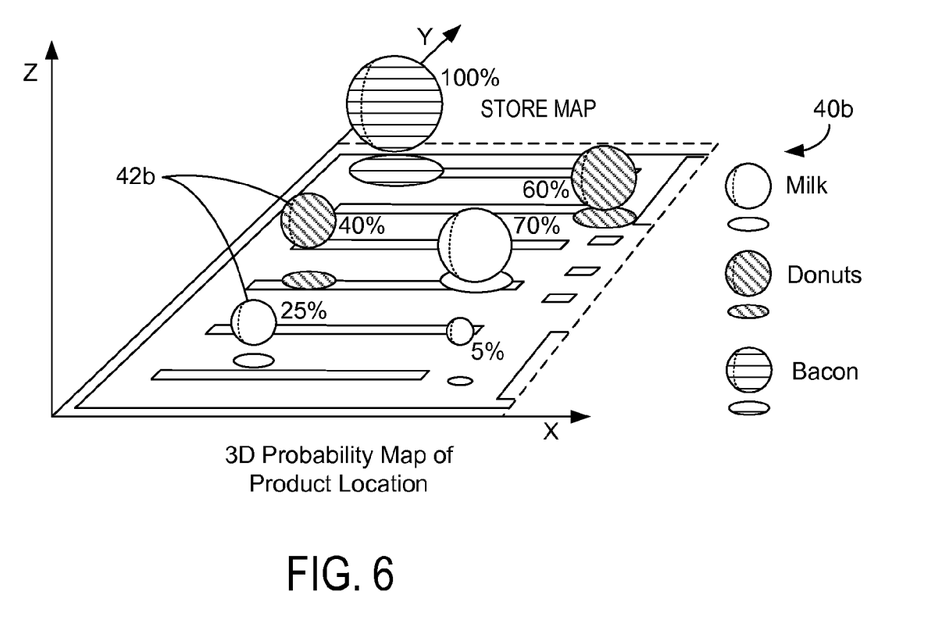
FIG. 6 shows a three dimensional probability map of imputed product location, outputted by the system of FIG. 1.
Figure 7:
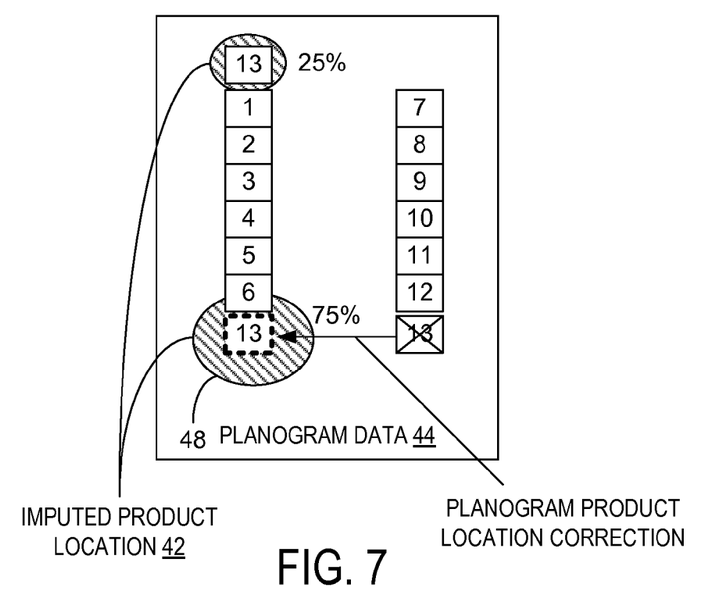
FIG. 7 shows a preexisting planogram in which an original product location is corrected by the system of FIG. 1, based on an imputed product location.

Imputing the product location may further include computing a probability that the target product 38 is located in a respective crossing region 36. The probability that a target product 38 is found at a given crossing region may be based upon the number of crossings in the crossing region. In some embodiments, the data analyzer computing device 24 may further be configured to proceed through the process described above to identify a plurality of crossing regions, illustrated at 36 and 36a in FIG. 2, associated with paths that have purchased the target product 38, and impute for the target product 38 a plurality of imputed product locations at each corresponding crossing region. FIGS. 6 and 7, discussed below, illustrate probability maps featuring indications of a plurality of imputed product locations for various products.

Each of the plurality of imputed product locations may be assigned a corresponding probability based upon the relative number of crossings in each of the associated crossing regions. Thus, for example, if in a sample of 100 paths, 10 paths cross in crossing region A, and 30 cross in region B and 60 cross in region C, then probabilities of 10%, 30%, and 60% may be assigned to each path in the set, for the product being purchased in each of regions A, B, and C, respectively. Another statistic that may be computed by the system is the percentage of paths that travel through the path crossing region of shoppers that do not purchase the product imputed to be at the location. Thus, the ratio of paths of purchasing shoppers to non-purchasing shoppers traveling through a path crossing region may be computed. Specifically, the data analyzer computing device may be configured to compute a ratio of paths in the path crossing region of shoppers that purchase a product from the path crossing region to paths in the path crossing region of shoppers who do not purchase the product from the path crossing region. These measures may be output in report form to brand owners who manufacture the target products, retailers who operate the store environment, etc.

Further, the probability that a target product is found at a given crossing region may additionally be computed based on the location of the crossing region. It may be likely that a crossing region 36 is identified at the entrance to a shopping environment 1, as shown in FIG. 2. In one embodiment the data analyzer computing device may filter out these crossing regions entirely, or compute a very low probability that the target product 38 is at this location, since the congregation of paths in these regions is not likely attributed to the product placement, but to the presence of the entrance. Similar zero or low probabilities may be assigned to bathrooms, customer service tables, and the like.

Figure 5:
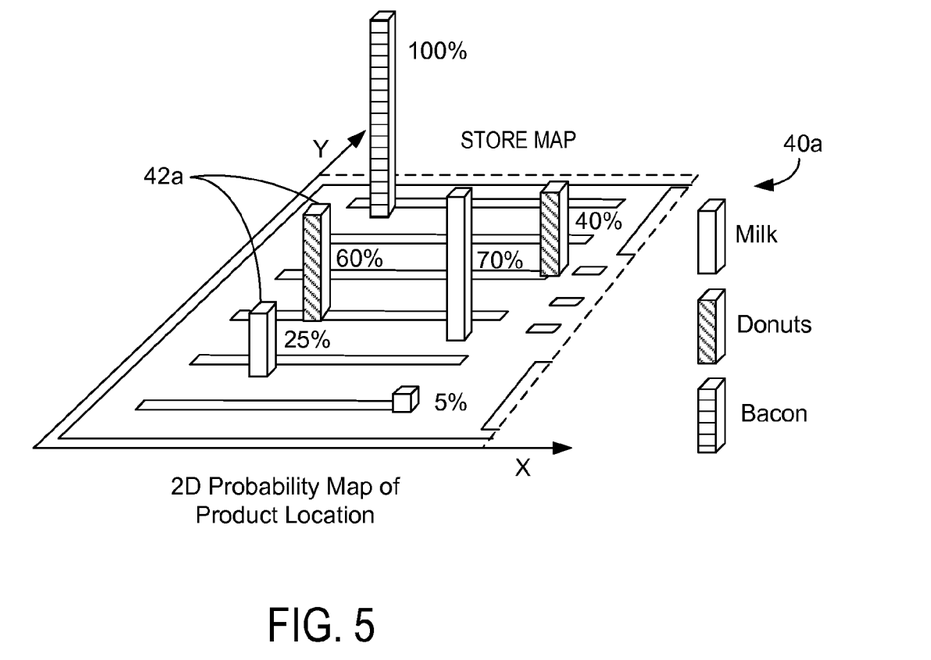
FIG. 5 shows a two dimensional probability map of imputed product location, outputted by the system of FIG. 1.

The data analyzer computing device 24 is configured to output at least one imputed product location 42 for one or more of the plurality of products analyzed as described above. The data analyzer computing device may generate and output a graphical indication, such as a map 40, of the imputed product location 42 of one or more of the plurality of the products. The map 40 may indicate the probability of each product being located at a corresponding location. The map may include graphical indicators of one or more possible locations of a target product determined as described above. At each location, the graphical indicator may indicate a probability that the target product is at the corresponding location. Specific examples of map 40 are illustrated in FIGS. 5 and 6. It will be appreciated that map 40 may be referred to as an imputed planogram, since the product locations therein are imputed based on path crossing regions of paths that are linked with purchases of the target product, as discussed above.

FIG. 5 illustrates one embodiment of a map 40a, which is a two-dimensional probability map of imputed product location. In map 40a, imputed product locations 42a for two example products, milk, donuts, and bacon, are shown graphed as graphical indicators in the form of bar graphs positioned at appropriate locations (corresponding to the identified path crossing regions discussed above) on a two dimensional representation of the store map. The relative height of each bar indicates the probability that each product is purchased from the location of the bar. For products imputed to be located at more than one location (i.e., milk and donuts) a plurality of bar graphs is shown, while for products only imputed to be at one location (i.e., bacon), only one bar graph is shown.

FIG. 6 illustrates one embodiment of a map 40b, which is a three-dimensional probability map of imputed product location. In map 40b, the imputed product locations 42b for the same example products, i.e., milk, donuts, and bacon, are shown as graphical indicators in the form of spheres in the three dimensional space of a store map. The size of the spheres indicates the probability that a product is purchased from each location. The height off the floor Z is represented by distance from a shadow icon under each sphere, and the shadow icon itself is positioned at the X, Y location corresponding to the imputed product location. As in the above example, products imputed to be at a plurality of locations are represented by a plurality of spheres with relative size indicating the probability of being at each location, while products only imputed to be at one location are represented by one sphere.

Returning to FIG. 1, the data analyzer computing device 24 may be configured to receive preexisting planogram data 44, which indicates two or three dimensional product position and shelf space allocation for each product within the store map. The preexisting planogram data 44 is typically deterministic in nature, and not probabilistic, which is to say that the preexisting planogram 33 has been determined using conventional methods such as generation by management for prescriptive purposes to guide product placement, or generation by human auditors for diagnostic purposes to measure product placement on store shelves, or a combination of the two. Descriptions of these conventional techniques are provided in the Background above.

Returning to FIG. 1, the data analyzer computing device 24 may also be configured to determine a correction 46 to a preexisting planogram 44, based upon the one or more imputed product locations 42 determined by the data analyzer computing device 24. The correction may be of the product location, shelf space allocation, or other suitable planogram parameter, as described below.

FIG. 7 illustrates that the correction 46 determined by the data analyzer computing device 24 may be a planogram product location correction. To implement such a correction, the data analyzer computing device 24 compares the imputed product locations 42 with the product locations indicated in the planogram data. If a discrepancy is identified between the imputed product locations 42 and the product locations in the planogram data, a product location correction is made to the planogram so that the planogram more closely matches the imputed product location. In the depicted example, product 13 is shown to be at two locations in the preexisting planogram data; however the imputed product locations of product 13 only match one of the original locations in the preexisting planogram. A 75% probability imputed product location for product 13 is indicated as 48. From this, it can be deduced that the preexisting planogram data 44 contains an error for the location of product 13. Accordingly, the data analyzer computing device is configured to make a correction to the planogram data, by deleting product 13 in the erroneous location, as indicated by an X, and adding product 13 in the imputed product location 48, as indicated in dashed lines. This helps ensure accurate planogram data.

Figure 8:
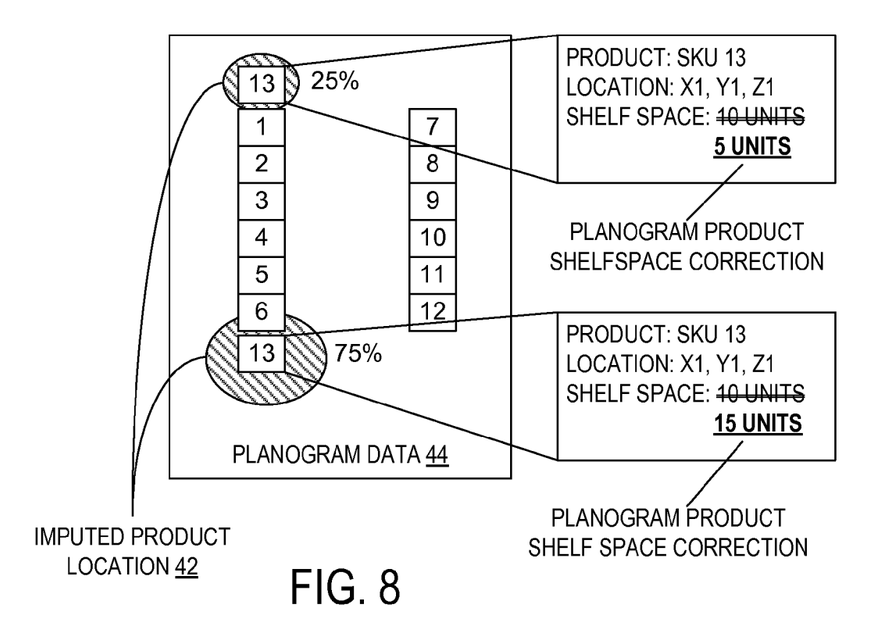
FIG. 8 shows a planogram in which a product shelf space allocation is corrected by the system of FIG. 1, based on probabilities associated with imputed product locations.

As shown in FIG. 8, the data analyzer computing device 24 may also be configured to implement a planogram product shelf space correction. The correction may be implemented programmatically without human review or may be outputted as a recommendation for review by a human operator, such as management, prior to adoption of the correction. In the depicted example, the locations of product 13 match between the preexisting planogram data 44 and the imputed product locations 42. However, the data analyzer computing device 24 compares the shelf space allocation indicated in the preexisting planogram data and identifies a discrepancy with the probabilities associated with each imputed product location for product 13. The shelf space allocation for each of the two locations of product 13 in the planogram data was originally 10 units. However, the data analyzer computing device computed the probability of the topmost location for product 13 in FIG. 8 to be 25% and the bottom most location to be 75%. Accordingly, the data analyzer computing device performs a planogram product shelf space correction to cause the shelf space allocations in the planogram data to substantially correspond to the ratio of these probabilities of the imputed product locations. In the depicted example, the shelf space at the topmost location is modified from 10 to 5 units, and the shelf space at the bottommost location is modified from 10 to 15 units. As a result, the ratio of allocated shelf space matches the ratio of probabilities of the imputed product locations. This may enable more efficient shelf space allocation, by putting more units of product closer to where data analysis shows it is actually being purchased. This correction may be programmatically implemented without human review, or may be a recommendation for a correction that is subject to human review as discussed above. The correction may be produced as a report of correction recommendations for a particular product display in the store, for a particular brand of product, or for all displays or products in the entire store, etc. This is one example of the use of imputed product locations to provide guidance for more efficient management of the store, its product displays and their planograms.

Figure 3:
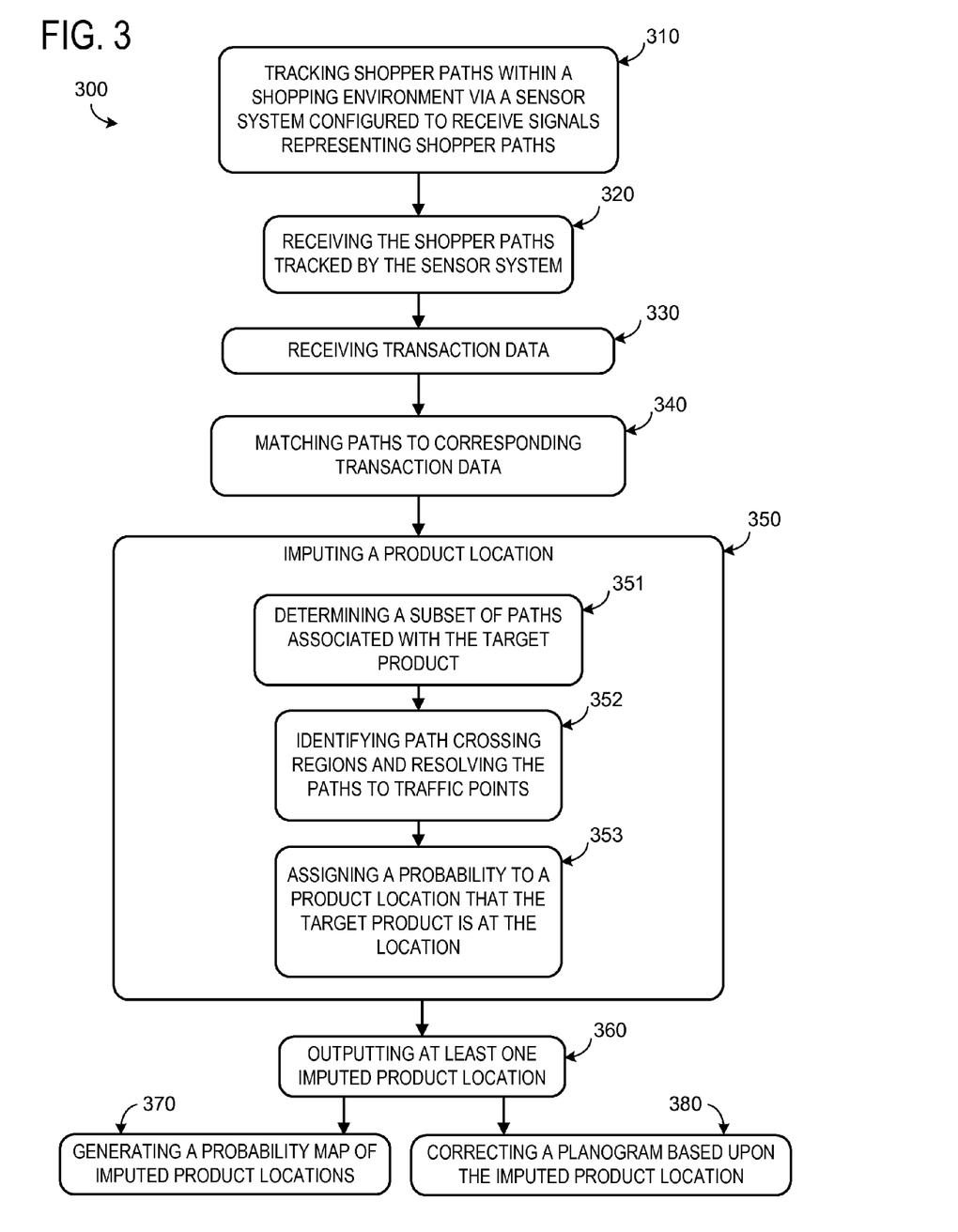
FIG. 3 is a flowchart of a method for imputing the location of a target product based on a subset of shopper paths and transaction data, according to one embodiment.

FIG. 3 shows one embodiment of a method 300 for imputing a product location within a shopping environment. The method 300 may be implemented by the systems and components described above or alternatively may be implemented via other suitable systems and components. At step 310 the method includes tracking paths via a sensor system for each of a plurality of shoppers in a shopping environment.

At step 320 the method 300 further includes receiving at a data analyzer computing device the paths from the sensor system. FIGS. 4A, 4B and 4C each show a graphical representation 400 of an exemplary shopper path 410 that could be received from a sensor system, such as sensor system 18 of FIG. 2, for example. At step 330 the method further includes receiving transaction data, for example, from a plurality of POS terminals, as described above.

Step 340 includes matching the received signal data to the received transaction data as discussed above. Step 350 includes imputing the product location within a shopping environment. Imputing at 350 may be accomplished by one or more of substeps 351, 352, and 353. Step 351 includes determining a subset of paths associated with a target product. Step 352 includes determining path crossing regions and resolving shopper paths to a grid of traffic points. At step 353, a probability that the target product is located at the path crossing region is assigned to the corresponding path crossing region. Step 360 includes outputting at least one product location with an associated probability that the product is at the location.

At 370, the method may include generating a probability map of imputed product locations in a shopping environment, specific examples of which are illustrated in FIGS. 6 and 7. These probability maps are in user readable form and may be displayed on a display. The probability map may function as a probabilistic planogram, as discussed above. This may have the advantages of saving time and costs associated with human tracking of products within shopping environments, and may also afford a greater accuracy than such systems, which can be prone to human error.

At 380, the method may include correcting a preexisting planogram based upon one or more imputed product locations determined as discussed above. The correcting may include making a product location correction in an existing planogram, as discussed in relation to FIG. 7, making a product shelf space allocation, as discussed in relation to FIG. 8, or other suitable correction to the planogram data based upon the imputed product locations.

It will be appreciated that the above systems and methods rely upon detection of wireless signals emanating from shoppers at certain locations in the store where detectors are positioned, from which paths may be built and linked to purchase transactions at the point of sale, which in turn may be used to probabilistically impute product locations throughout the store. However, not all shoppers carry mobile devices that emanate such wireless signals. The systems and methods described herein can nonetheless be used to compute valuable information about these untracked shoppers as well.

Once the probabilistic product location map has been computed as described above, the system may be configured to examine purchase transactions from untracked shoppers, and impute a path taken by each untracked shopper, based on the imputed product locations for the items in each untracked shopper's purchase transaction data. From the transaction logs, each untracked shopper is known to have purchased a list of products, which are imputed to be located at certain locations based on the tracked shopper data discussed above. For the untracked shoppers, each item on the list of purchased products can be assigned the imputed location, or in many cases a plurality of imputed locations, each with an assigned probability. The result is a plurality of imputed locations that may be linked by an imputed path for the untracked shopper.

A variety of path generation algorithms may be applied to perform the linking of these imputed product locations into imputed paths for untracked shoppers. It will be appreciated that an optimal solution, such as has been sought to the well-known traveling salesman problem, need not be devised. Rather, sub-optimal, or heuristic solutions will more closely resemble actual shopper behavior in the store. Thus, a variety of heuristics may be applied to model the untracked shoppers as they travel to all of the imputed product locations. For example, a shortest distance algorithm may be applied by which the untracked shopper is presumed to always travel from a store entrance, to the closest imputed product location on the shopper's transaction log, then to the next closest imputed product location, etc., and finally to the checkout location that the shopper actually visited. This is but one of many possible algorithms that may be applied to impute the untracked shopper paths. As a result of the above analysis, the paths of untracked shoppers may be imputed from the imputed product locations, thereby giving further insight into the behavior of shoppers in the store during the shopping experience.

It will be appreciated that the above systems and methods may be used without direct detection of the specific placement of the products in stores through sensor systems that detect RFID or other tags located on products themselves. Further, the above systems and methods may be used without employing direct analysis, via video recording or live observation, of product locations in a store. Rather, the present systems and methods rely upon statistical analysis of shopper path data and transaction data to impute product locations within a store or other shopping environment, thereby saving time and money over such direct determination of product location through sensors, video, or live observation, and indeed may be used to verify or correct the output of such methods as discussed in relation to FIGS. 7 and 8.

Figure 9:
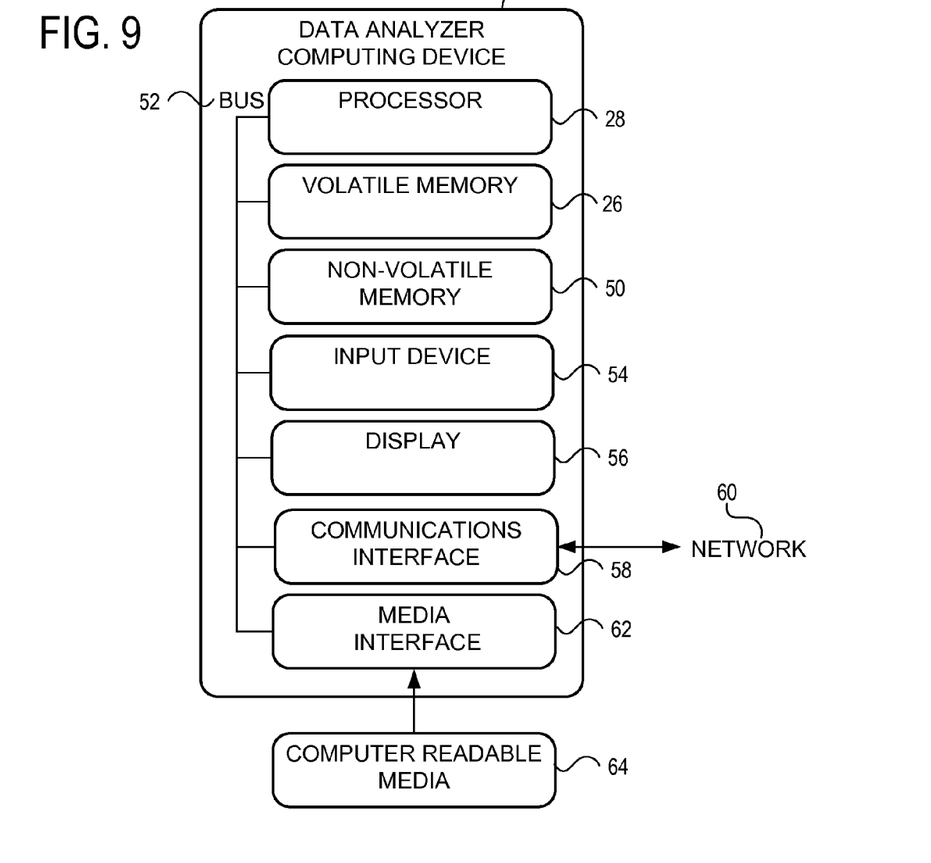
FIG. 9 shows a schematic view of an exemplary data analyzer computing device according to the system of FIG. 1.

FIG. 9 is a schematic view of the hardware components of data analyzer computing device 24. As shown, data analyzer computing device 24 may include a processor 28 configured to execute one or more programs stored in non-volatile memory 50 using portions of volatile memory 26 and an associated communications bus 52. It will be appreciated that non-volatile memory includes mass storage devices such as FLASH memory and hard drives, as well as ROM, EEPROM and other non-volatile storage devices. Data analyzer computing device 24 may further include an input device 54 such as a touch screen, mouse, keyboard, etc. for receiving user input, as well as a display 56 for displaying the output of the data analyzer computing device. A communications interface 58 may be provided for sending and receiving data, such as signal data 30 and transaction data 32 discussed above, over one or more associated wired or wireless computer networks 60. A media interface 62 may be provided for reading computer readable media 64. The computer readable media is typically non-volatile storage media such as a DVD, CD ROM, FLASH drive, or other media capable of storing data thereon. It will be appreciated that programs and data for implementing the various methods described herein may be stored on computer readable media 64. The programs and data are typically stored on the computer readable media 64 in a non-transitory manner, which does not include signals per se. It will be appreciated that the data analyzer computing device described herein may be any suitable computing device configured to execute the programs described herein. For example, the computing device may be a mainframe computer, personal computer, laptop computer, portable data assistant (PDA), mobile telephone, networked computing device, or other suitable computing device.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

The invention claimed is:

1. A system for locating products in a shopping environment, comprising:
a sensor system configured to track paths for a plurality of shoppers in a shopping environment; and
a data analyzer computing device comprising memory configured to be executed by a processor to:
receive signal data from the sensor system and derive a plurality of shopper paths from the signal data;
receive transaction data including a plurality of transaction records, each transaction record indicating products purchased by a shopper at a point of sale terminal in the shopping environment;
match a transaction record to each of the shopper paths;
impute a product location for a product on at least the basis that the product appears in the transaction records associated with more than one shopper path, at least in part by:
determining a subset of the paths associated with the product, wherein the transaction data associated with each of the paths indicates that a shopper that traveled on each path purchased the product;
identifying a path crossing region in the subset of paths having a threshold number of crossings; and
assigning a probability to the path crossing region that the product is located at the path crossing region;
generate planogram data or make a correction to pre-existing planogram data based upon the imputed product location; and
output an indication of the imputed product location.

2. The system of claim 1, wherein the data analyzer computing device is further configured to compute a ratio of paths in the path crossing region of shoppers that purchase a product from the path crossing region to paths in the path crossing region of shoppers who do not purchase the product from the path crossing region.

3. The system of claim 1, wherein the probability is based on the number of crossings.

4. The system of claim 1, wherein the imputed product location is one of a plurality of product locations that is imputed by the data analyzer computing device, each of the plurality of product locations having an associated crossing region, and wherein the data analyzer computing device is further configured to assign a respective probability to each of the imputed product locations, each respective probability being computed based upon the relative number of crossings in each of the associated crossing regions.

5. The system of claim 4, wherein the data analyzer computing device is further configured to:
generate a probability map including the indications of the plurality of imputed product locations.

6. The system of claim 1, wherein the correction is a product location correction or a product shelf space allocation correction.

7. A method for imputing a product location within a shopping environment, comprising:
tracking paths via a sensor system for each of a plurality of shoppers in a shopping environment; and
executing memory with a processor of a data analyzer computing device to:
receive the paths from the sensor system;
receive from a point of sale system in the shopping environment transaction data indicating products purchased by the shoppers;
match paths to corresponding transaction data for the path;
impute a product location within the shopping environment based on the path and transaction data, at least in part by:
determining a subset of the paths associated with a product, wherein the transaction data associated with each of the paths indicates that a shopper that traveled on each path purchased the product;
identifying a path crossing region in the subset of paths having a threshold number of crossings; and
assigning a probability to the path crossing region that the product is located at the path crossing region;
generate planogram data or make a correction to pre-existing planogram data based upon the imputed product location; and
output an indication of the imputed product location.

8. The method of claim 7, further comprising computing a ratio of paths in the path crossing region of shoppers that purchase a product from the path crossing region to paths in the path crossing region of shoppers who do not purchase the product from the path crossing region.

9. The method of claim 7, wherein the imputed product location is one of a plurality of imputed product locations, each of the plurality of product locations having an associated crossing region, and wherein a respective probability is assigned to each of the imputed product locations, each respective probability being computed based upon the relative number of crossings in each of the associated crossing regions.

10. The method of claim 9, further comprising:
generating a probability map including the indications of the plurality of imputed product locations; and
displaying the probability map on a display.

11. The method of claim 10, wherein the correction is a product location correction or a product shelf space allocation correction.

12. A method for imputing a product location within a shopping environment, comprising:
tracking paths via a sensor system for each of a plurality of shoppers in a shopping environment;
executing memory with a processor of a data analyzer computing device to:
receive the paths from the sensor system;
receive from a point of sale system in the shopping environment transaction data indicating products purchased by the shoppers;
match paths to corresponding transaction data for the path;
impute product locations for a plurality of products based on the path and transaction data, at least in part by:
determining a subset of the paths associated with each of a plurality of target products, wherein the transaction data associated with each of the paths indicates that a shopper that traveled on each path purchased each target product;
for each target product, identifying a path crossing region in the subset of paths having a threshold number of crossings; and
assigning a respective probability to each path crossing region that a corresponding target product is located at the path crossing region, each respective probability being computed based upon the relative number of crossings in each of the associated crossing regions;
generate a probability map including the indications of the plurality of imputed product locations;
generate planogram data or make a correction to pre-existing planogram data based upon the imputed product location; and
display the probability map on a display.

* * * * *

UNITED STATES PATENT AND TRADEMARK OFFICE
CERTIFICATE OF CORRECTION

PATENT NO. : 9,633,328 B2
APPLICATION NO. : 13/684347
DATED : April 25, 2017
INVENTOR(S) : Herb Sorensen Page 1 of 1

It is certified that error appears in the above-identified patent and that said Letters Patent is hereby corrected as shown below:

In the Claims

Column 12, Line 5, Claim 11, delete "claim 10" and insert --claim 7--.

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*